Nov. 16, 1948.　　　　W. N. ALLYN　　　　2,453,887
DIAGNOSTIC INSTRUMENT FOR EXAMINING THE EYE
Filed March 9, 1945　　　　　　　　　　2 Sheets-Sheet 1
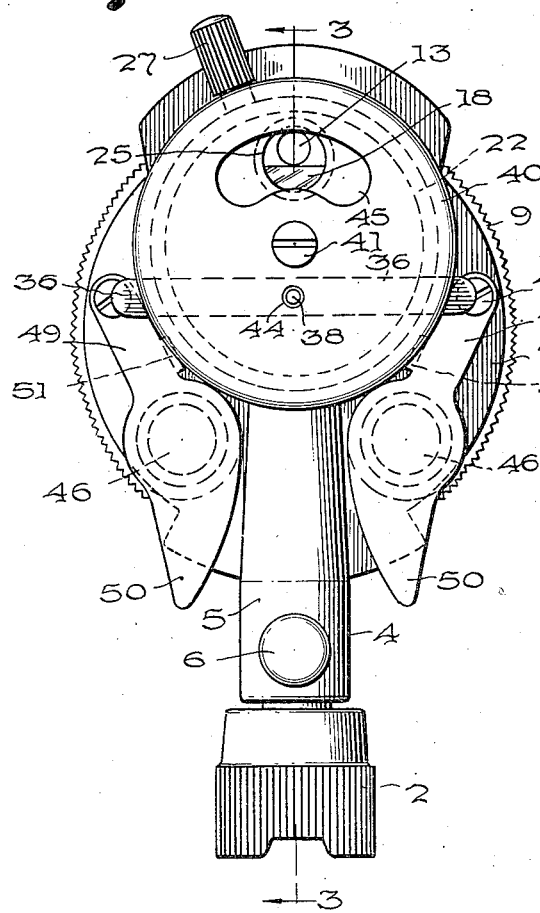
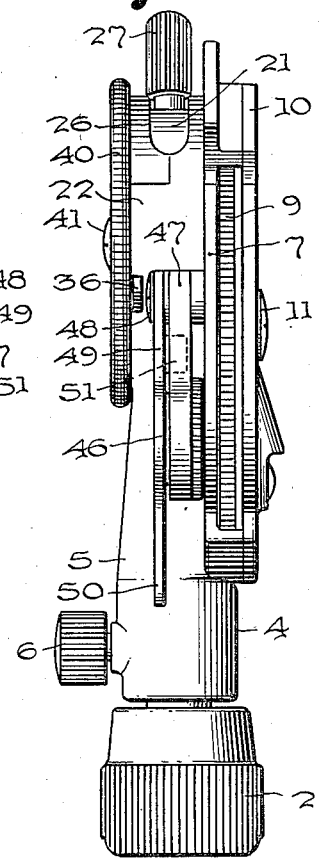
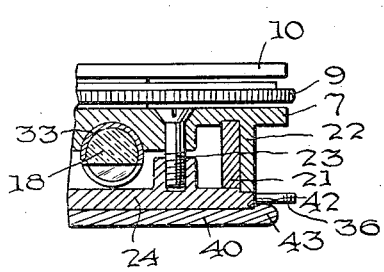

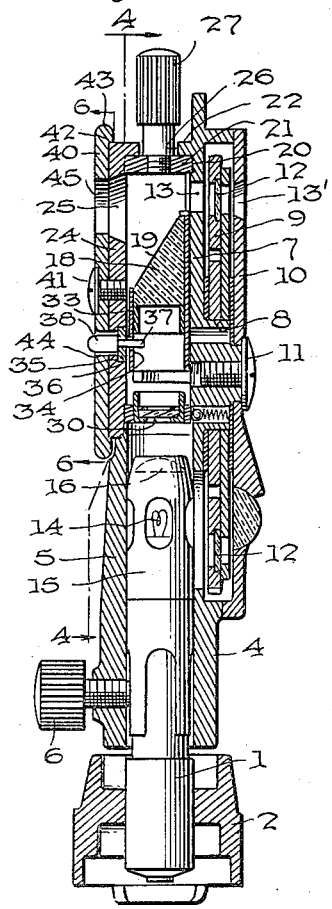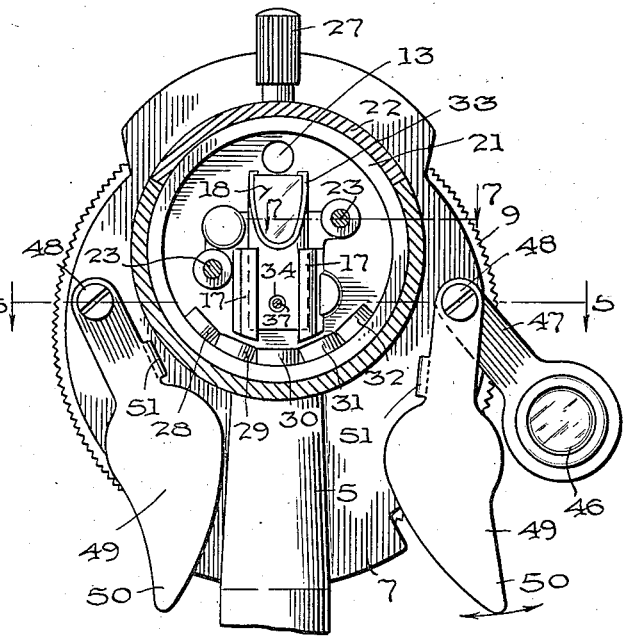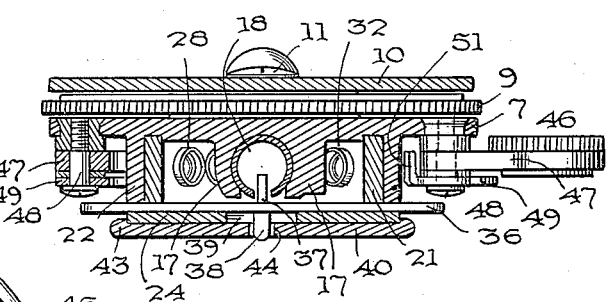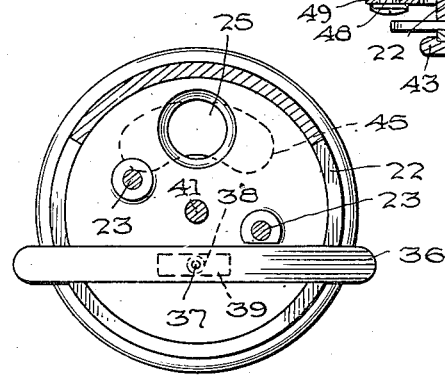

Patented Nov. 16, 1948

2,453,887

UNITED STATES PATENT OFFICE 2,453,887

DIAGNOSTIC INSTRUMENT FOR EXAMINING THE EYE

William N. Allyn, Skaneateles, N. Y., assignor to Welch Allyn, Inc., Auburn, N. Y., a corporation of New York Application March 9, 1945, Serial No. 581,752

1 Claim. (Cl. 88—20)

The present invention relates to diagnostic instruments, and more especially to optical instruments of the hand type which are primarily adapted for making preliminary examinations of the eye or other objects which can best be studied microscopically under illumination.

Many pathological conditions of the cornea, iris, crystalline lens, and the anterior portion of the vitreous can be detected in their incipient stages by projecting a narrow beam of light into the eye to reveal the detail within the media under good magnification. In addition, foreign bodies, ulcers, and scars may be shown up by employing the oblique method in which a beam of light is thrown across the cornea from the temporal side to the nasal side. By proper control of the size and intensity of the light beam and the angle of illumination, examinations can be made more readily and successfully, especially when looking into the deep recesses of the eye, and without causing undue cornea reflex.

This invention has been developed primarily for application to a well known type of ophthalmoscope, such as is disclosed in Patent No. 2,311,503, granted February 16, 1943. It is to be understood, however, that the invention is not confined to use with such instruments, as it may be applied to other instruments with equal facility, or it may be constructed as a separate instrument. For the purposes of illustrating herein one practical form of the invention, the drawings and detailed description are directed to the ophthalmoscope type of hand instrument.

One of the primary objects of my invention is to provide an improved optical instrument of the hand type which is simple and compact in form, and which essentially includes a self-contained source of illumination to produce a beam of light which may be quickly and conveniently adjusted to vary the angle of illumination without changing the position of the instrument itself.

Another object of the invention is to provide an instrument of the aforementioned character which may be used with equal facility for examination with either eye of the operator, and which embodies readily adjustable selective magnifying means for use with either eye of the operator.

A further object of the invention is to provide an instrument of the type referred to above, in which the size and shape of the light beam may be quickly and easily adjusted, and the concentration of the light suitably regulated as desired by the operator, all with a minimum of effort and with negligible loss of time.

A still further object of the invention is to provide a multi-purpose or universal instrument having the functions of both an ophthalmoscope and what is known in the trade as a slit lamp, and embodying a common source of light, the beam of which may be closely regulated particularly with respect to concentration and angle of illumination.

Other and further objects and advantages of the invention will be hereinafter described and the novel features thereof defined by the appended claim.

In the drawings:

Figure 1 is a view in elevation of a conventional ophthalmoscope head to which the present invention has been applied as one illustration of the use thereof, the head being seen in this view from the subject's side to more clearly show the adjustable magnifying lenses and the regulating means for adjusting the angle of illumination;

Figure 2 is a view of the instrument head of Figure 1, as seen in side elevation;

Figure 3 is a vertical sectional view taken on the line 3—3 of Figure 1, with certain of the parts of the instrument shown in elevation;

Figure 4 is a fragmentary sectional view taken on the line 4—4 of Figure 3 and showing more clearly the angularly adjustable prism of the optical illuminating system;

Figure 5 is a horizontal sectional view taken on the line 5—5 of Figure 4;

Figure 6 is a sectional view taken on the line 6—6 of Figure 3; and

Figure 7 is a fragmentary detail view, shown partly in section and partly in elevation, the section being on the line 7—7 of Figure 4.

Like reference characters designate corresponding parts in the several figures of the drawings, wherein 1 denotes a lamp-supporting spindle having a coupling 2 fixed to its lower end for detachable connection with a conventional battery handle (not shown), or to some other suitable source of electrical energy, the details of which are immaterial to this invention. It will be understood, however, that when the instrument head shown in the drawings herein is connected by the coupling 2 to the battery handle, the battery handle serves as a means for manipulating the instrument during its use in examining or treating the object under observation.

Attached to the spindle 1 is a frame generally designated 4, which includes a cylindrical or tubular part 5 which receives the spindle 1 to which the frame is removably attached by means of a set screw 6. At the front or observer's side of the tubular part 5, is an upright stationary plate 7 having a central annular boss 8 on which is rotatably mounted a main lens carrier or disc 9. A front cover plate 10 is removably attached to the frame 4 by means of a screw 11 threadedly received in the boss 8 of the frame plate 7.

The main lens carrier 9 is free to rotate on the boss 8 between the plates 7 and 10, and carries adjacent to its periphery a plurality of equally spaced lenses 12 which are selectively registrable with a sight opening 13 in the plate 7 and a corresponding sight opening 13' in the cover plate 10, near the upper end of the frame 4. The sight openings 13, 13' are coaxial with each other so that as the main lens carrier 9 is rotated about its central axis, the various lenses 12 carried thereby, and which are of different dioptrics, are successively brought into register with the sight openings so that the observer may view the eye or other object under examination through the sight openings and the interposed selected lens, as in the customary use of an ophthalmoscope.

Carried by the spindle 1 and disposed within the tubular portion 5 of the frame 4 is a small but powerful electric lamp 14 over which is positioned a ferrule 15 having mounted in its upper end a condenser lens 16. Disposed above the lamp 14 and adjustably mounted in a split bearing frame 17 fixed to the back of the frame plate 7, is a prism 18 through which the light rays from the lamp 14 are projected. As the light rays pass through the prism, they are reflected by the reflecting surfaces thereof and emerge from the rear face 19 of the prism in a direction generally parallel to and just below the axis of the sight openings 13, 13', so that as the observer looks through the sight openings into the eye of the subject under examination, the eye will be illuminated clearly by the light rays.

Suitable means are provided for identifying the respective lenses in the main lens carrier 9 as they are selectively brought into registration with the sight openings 13, 13', as more fully disclosed in the prior Patent No. 2,311,503, hereinbefore referred to. Since these means are not important or essential to the present invention, they will not be described herein.

The back of the frame plate 7, that is, the side next to the subject under examination, is provided with an annular recess 20 in which there is seated an annular ring 21 which is free to rotate about its central axis. This ring 21 is enclosed in a cup-shaped housing generally designated 22, the front portion of which housing is formed integrally with the frame plate 7, and the back portion thereof being removably attached thereto by screws 23, 23, as best shown in Figures 4 and 7. The back wall 24 of the housing 22 is provided with an enlarged opening 25 which is of sufficient size and so located as to permit an unobstructed view therethrough through the sight openings 13, 13' previously described, and also to permit the light rays to be directed therethrough from the prism 18. The housing 22 is also provided with an elongated slot 26 at its upper side through which extends a knob or arm 27 which is fixed at its inner end to the ring 21. By means of this knob 27, angularly shifting movements may be conveniently imparted to the ring 21.

It will be seen from reference to the drawings that the ring 21 encircles the prism 18, and the upper side of the ring is positioned above the sight openings 13, 13', whereas the lower side of the ring is interposed between the lamp 14 and the prism 18. The ring is provided at its lower side with a plurality of openings arranged in equally spaced relation to each other in the lower half of the ring. Mounted in these respective openings is a series of light-modifying units which may have various controlling effects on the light rays. For example, one of these units 28 may comprise a large aperture, another unit 29 may comprise a small aperture or pin hole, another unit 30 may comprise a narrow slit, another unit 31 may comprise a color filter, and a further unit 32 may comprise a light diffusing element. The number of these units, 28 to 32 inclusive, may be varied according to the requirements of the user, and may be supplemented by additional units, such as Polaroid lenses, graticules, etc., if desired. By selectively adjusting the ring 21 rotatively with the aid of the knob 27, the units 28 to 32 may be selectively interposed in the light beam at a point between the lamp 14 and the prism 18 of the illuminating system, the effect of which is to selectively vary the concentration, size, and shape or other characteristics of the light beam, which is finally projected rearwardly through the opening 25 and into the eye of the subject under examination. This regulation of the light beam may be availed of both in the use of the lenses 12 in the main lens disc 9, or independently thereof, as will now be more fully described.

In addition to the regulation of the light beam in the manner above referred to, it is also desirable at times to vary the angle of illumination. This variation of the angle of illumination can be simply and effectively produced by rotatively adjusting the prism 18. To this end, the prism is free to turn in the bearing 17, and the prism is preferably mounted in a tubular sleeve 33 which is provided adjacent its lower end with an aperture 34 at the back of the sleeve.

The rear wall of the housing 22 is provided on its inner face with a horizontally extended recess 35 which is continued completely across the wall from side to side and in which is seated a slide bar 36 which is freely movable longitudinally therein in an endwise direction. Fixed to the center of the slide bar 36 and extending inwardly therefrom is a pin 37 which projects into the opening 34 in the sleeve 33 in which the prism 18 is mounted. The opposite end of the pin 37 is enlarged, as at 38, and projects rearwardly from the slide bar 36 through an elongated slot 39 provided in the back wall 24 of the housing 22, so that the slide bar 36 has a substantial range of movement in an endwise direction as above referred to.

Mounted on the back wall 24 of the housing 22 is a disc member 40, the disc being rotatably connected to the wall at its center by a screw 41 extending through the disc and threadedly received in the wall 24. The disc 40 is preferably recessed at its forward side to provide an annular shoulder 42 which extends about the periphery of the housing 22 to aid in centralizing the disc on the housing. The outer margin of the disc 40 preferably extends somewhat beyond the outer margin of the housing 22, as at 43, in order that rotation may be readily imparted to the disc by the finger tips of the operator's hand, this marginal edge of the disc being suitably knurled or serrated.

Below the screw 41, the disc 40 is provided with an opening 44 in which the enlarged end 38 of the pin 37 is loosely received, as clearly shown in the drawings, particularly Figures 3 and 5.

Accordingly, when the disc 40 is rotated in either direction, movement is imparted to the eccentric pin 37, 38 which in turn produces an endwise movement of the slide bar 36 which is guided in the recess 35 to confine the movement of the slide bar 36 in a straight line laterally across the back of the instrument. This lateral movement of the slide bar in turn produces a limited rotation of the prism 18 due to engagement of the pin 37 with the opening 34 in the sleeve 33 in which the prism is mounted. This rotation of the prism in either direction, according to the direction of rotation of the disc 40, causes the light beam projected rearwardly from the prism to shift to the right or to the left of the line of observation through the sight openings 13, 13', thus changing the angle of illumination of the eye or other object under examination, so that the light beam may be directed onto the particular spot to be viewed. In order to prevent the disc 40 from obstructing the light beam and the line of observation through the sight openings 13, 13', the disc is provided with an arcuate slot 45 which is at least as deep as the opening 25 in the back wall 24 of the housing 22, and of sufficient length to leave the opening 25 unobstructed throughout the range of rotative adjustment of the disc in opposite directions.

This change of the angle of illumination may be also availed of to advantage in utilizing the instrument without making the observations through the sight openings 13, 13', and I have particular reference in this regard to examinations of the eye by the oblique method hereinbefore referred to, where the light beam is thrown across the cornea from the temporal side to the nasal side in order to more effectively show up foreign bodies, ulcers, and scars. To aid in such examinations, the instrument is provided with magnifying means which are preferably attached to the back of the instrument and selectively adjustable from an extended operative position to a retracted out-of-the-way position. As shown in the drawings, I preferably provide two separate magnifying means, one on each side of the instrument so that they can be selectively used with either eye of the observer. Each magnifying means includes a magnifying lens 46 mounted at the outer end of an arm or lens holder 47 which is pivotally secured at its end, as at 48, to the back of the frame plate 7, thus permitting the arm 47 and its lens 46 to be swung outwardly from a normally retracted position, as shown in Figure 1, to a laterally extended position as shown at the righthand side of Figure 4.

In order to facilitate movement of the lenses 46 and their supporting arms 47 from the retracted to the extended positions, and to protect the lenses when not in use, I preferably provide a guard or cover 49 for each lens having the form of a flat plate of a shape generally conforming to the outline of the arm or lens holder. The inner end of the guard 49 overlies the inner end of the arm 47 at the pivot 48, so that the guard is free to swing in the same manner as the lens carrier. The free end of the guard is extended at 50 so that when the guard is in its retracted position, the extension 50 projects slightly beyond the marginal edge of the frame plate 7, so that it may be readily engaged by the operator's fingers to swing the guard in an outward direction. At an intermediate point along the inner edge of each guard, the guard is provided with a downwardly extended tongue 51 which is adapted to abut against the arm 47 of the lens carrier. Thus, when the guard 49 is swung outwardly to an extended position, the abutment tongue 51 engages the arm 47 of the lens carrier and simultaneously swings the magnifying lenses to their operative extended positions, or at least to a position sufficiently extended as to more readily enable the lens carrier to be manipulated by the user to the desired adjusted position for viewing the particular illuminated area under examination. When the magnifying lens carrier has been moved outwardly by means of the swinging movement of the guard 49, which in fact is a combination guard and actuator, the guard may be retracted independently of the lens carrier and magnifying lens, so that it will lie in an out-of-the-way position behind the frame plate 7 of the instrument, as shown at the lefthand side of Figure 4. To restore the magnifying lens and the lens carrier to its normally out-of-the-way position, it is simply necessary to swing the same inwardly until it occupies the position shown in dotted lines in Figure 1, the magnifying lens and its carrier being freely movable beneath the guard 49 in case the latter is already in its retracted position.

Likewise, where the magnifying means has been described and shown as having the form of a magnifying lens designated 46, it will be obvious that it is within the purview of my invention to employ a still more powerful magnifying system, such as a small telescope or the like.

The construction and use of the invention will be apparent from the foregoing and no further detailed description appears to be necessary. It is to be understood, however, that changes and alterations may be made in the specific details which have been herein shown and described, without departing from the spirit thereof as defined by the appended claim.

I claim:

A diagnostic instrument, comprising a portable lamp support, a lamp mounted on said support, a light projecting prism mounted on said support in the axial path of the light beam from the lamp and rotatable in opposite directions about an axis coinciding with the axis of the lamp, said prism having a light-reflecting surface for projecting the light beam substantially perpendicular to the axis of the lamp, and means instantaneously adjustable independently of movement of the lamp support and lamp for rotating the prism about its axis aforesaid for laterally shifting the projected light beam in a plane substantially perpendicular to the axis of the lamp, said last-named means comprising an actuating member rotatably mounted on said support, a laterally shiftable slide member mounted on said support, and a pin carried by said slide member, said pin being eccentrically connected to the rotatable actuating member and also operatively connected to the prism for rotatively adjusting the prism about its axis aforesaid.

WILLIAM N. ALLYN.

REFERENCES CITED

The following references are of record in the file of this patent:

UNITED STATES PATENTS

| Number | Name | Date |
| --- | --- | --- |
| 718,384 | Reisner | Jan. 13, 1903 |
| 737,087 | De Zeng | Aug. 25, 1903 |
| 1,130,106 | Rhodes | Mar. 2, 1915 |

(Other references on following page)

UNITED STATES PATENTS

| Number | Name | Date |
|---|---|---|
| 1,693,021 | Cameron | Nov. 27, 1928 |
| 1,849,701 | Allyn | Mar. 15, 1932 |
| 1,889,456 | Tillyer | Nov. 29, 1932 |
| 2,027,663 | Allyn | Jan. 14, 1936 |
| 2,110,330 | Freeman | Mar. 8, 1938 |
| 2,122,753 | Ridabock | July 5, 1938 |
| 2,297,232 | Marten et al. | Sept. 29, 1942 |
| 2,370,514 | Arnesen | Feb. 27, 1945 |
| 2,311,503 | Allyn et al. | Feb. 16, 1943 |

FOREIGN PATENTS

| Number | Country | Date |
|---|---|---|
| 429,636 | Great Britain | June 4, 1935 |